(12) United States Patent
Vlasak et al.

(10) Patent No.: US 10,751,605 B2
(45) Date of Patent: Aug. 25, 2020

(54) TOYS THAT RESPOND TO PROJECTIONS

(71) Applicant: Intel Corporation, Santa Clara, CA (US)

(72) Inventors: Blanka Vlasak, Beaverton, OR (US); Glen J. Anderson, Beaverton, OR (US); Meng Shi, Hillsboro, OR (US); Ravishankar Iyer, Portland, OR (US); Therese E. Dugan, Sunnyvale, CA (US); Mark R. Francis, Portland, OR (US); David I. Poisner, Carmichael, CA (US); Yevgeniy Y. Yarmosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 15/280,192

(22) Filed: Sep. 29, 2016

(65) Prior Publication Data
US 2018/0085663 A1 Mar. 29, 2018

(51) Int. Cl.
*A63H 30/02* (2006.01)
*A63F 9/24* (2006.01)
*A63H 17/28* (2006.01)
*A63H 17/36* (2006.01)
*A63F 13/35* (2014.01)
*A63F 13/28* (2014.01)
*A63F 13/26* (2014.01)
(Continued)

(52) U.S. Cl.
CPC .............. *A63F 9/24* (2013.01); *A63F 13/213* (2014.09); *A63F 13/26* (2014.09); *A63F 13/28* (2014.09); *A63F 13/35* (2014.09); *A63F 13/92* (2014.09); *A63H 17/28* (2013.01); *A63H 17/36* (2013.01); *A63F 2009/2435* (2013.01); *A63F 2009/2461* (2013.01); *A63H 2200/00* (2013.01)

(58) Field of Classification Search
CPC .......... A63F 13/10; A63F 13/42; A63F 13/92; A63F 13/53; A63F 13/803; A63F 30/04; A63H 17/00
See application file for complete search history.

(56) References Cited

U.S. PATENT DOCUMENTS 5,545,072 A * 8/1996 Arad ...................... A63H 3/003
                                                                446/219
7,027,460 B2 4/2006 Iyer et al.
(Continued)

FOREIGN PATENT DOCUMENTS

TW           I551334 B    10/2016

OTHER PUBLICATIONS

Anki Overdrive, "Battle and Race Robotic Supercars," anki.com/en-us/overdrive/supercars, retrieved on Sep. 2, 2016, 14 pages.
(Continued)

*Primary Examiner* — James S. McClellan
*Assistant Examiner* — Kevin M Carter
(74) *Attorney, Agent, or Firm* — Jordan IP Law, LLC

(57) ABSTRACT

An embodiment of an interactive play apparatus may include a camera to capture a projected image, an image recognizer communicatively coupled to the camera to recognize the captured projection image, and a projection responder communicatively coupled to the image recognizer to respond to the recognized projection image. Other embodiments are disclosed and claimed.

3 Claims, 8 Drawing Sheets

(51) Int. Cl.
*A63F 13/92* (2014.01)
*A63F 13/213* (2014.01)

(56) References Cited

U.S. PATENT DOCUMENTS

| | | | |
|---|---|---|---|
| 8,340,477 B2 | 12/2012 | Foss et al. | |
| 8,610,730 B1* | 12/2013 | Li | G06F 3/1454 |
| | | | 345/520 |
| 8,634,848 B1* | 1/2014 | Bozarth | H04W 64/00 |
| | | | 455/41.2 |
| 8,736,583 B2 | 5/2014 | Anderson et al. | |
| 8,839,134 B2 | 9/2014 | Anderson et al. | |
| 8,913,085 B2 | 12/2014 | Anderson et al. | |
| 8,977,972 B2 | 3/2015 | Anderson et al. | |
| 9,201,500 B2 | 12/2015 | Srinivasan et al. | |
| 9,202,082 B2 | 12/2015 | Hochberg et al. | |
| 9,264,515 B2 | 2/2016 | Ganapathy et al. | |
| 9,330,478 B2 | 5/2016 | Anderson | |
| 9,389,779 B2 | 7/2016 | Anderson et al. | |
| 9,430,035 B2 | 8/2016 | Anderson et al. | |
| 9,495,397 B2 | 11/2016 | Anderson et al. | |
| 9,524,587 B2 | 12/2016 | Anderson | |
| 2004/0268143 A1 | 12/2004 | Poisner | |
| 2005/0015611 A1 | 1/2005 | Poisner | |
| 2006/0223637 A1* | 10/2006 | Rosenberg | A63F 13/10 |
| | | | 463/47 |
| 2008/0185438 A1* | 8/2008 | Pinchen | G06K 7/14 |
| | | | 235/462.01 |
| 2008/0246694 A1* | 10/2008 | Fischer | G02B 27/017 |
| | | | 345/9 |
| 2009/0081923 A1* | 3/2009 | Dooley | A63F 9/143 |
| | | | 446/456 |
| 2009/0291764 A1* | 11/2009 | Kirkman | A63H 11/00 |
| | | | 463/43 |
| 2011/0207504 A1 | 8/2011 | Anderson et al. | |
| 2012/0181329 A1* | 7/2012 | Gratton | G06K 7/1417 |
| | | | 235/375 |
| 2012/0229596 A1* | 9/2012 | Rose | G06T 3/4038 |
| | | | 348/36 |
| 2013/0032634 A1* | 2/2013 | McKirdy | A61B 5/0205 |
| | | | 235/375 |
| 2013/0100009 A1* | 4/2013 | Willis | H04N 9/3147 |
| | | | 345/156 |
| 2013/0217491 A1* | 8/2013 | Hilbert | A63F 13/00 |
| | | | 463/31 |
| 2013/0271491 A1 | 10/2013 | Anderson | |
| 2013/0290106 A1* | 10/2013 | Bradley | G06Q 90/20 |
| | | | 705/14.64 |
| 2013/0290876 A1 | 10/2013 | Anderson et al. | |
| 2013/0293584 A1 | 11/2013 | Anderson | |
| 2014/0091949 A1 | 4/2014 | Tickoo et al. | |
| 2014/0092005 A1 | 4/2014 | Anderson et al. | |
| 2014/0192715 A1 | 7/2014 | Tickoo et al. | |
| 2014/0201281 A1 | 7/2014 | Tickoo et al. | |
| 2015/0070382 A1 | 3/2015 | Anderson | |
| 2015/0154769 A1 | 6/2015 | Anderson et al. | |
| 2015/0172541 A1 | 6/2015 | Anderson | |
| 2015/0186628 A1 | 7/2015 | Bush et al. | |
| 2015/0258434 A1* | 9/2015 | Scott | A63F 13/235 |
| | | | 463/39 |
| 2015/0268717 A1* | 9/2015 | Schlumberger | A63F 13/00 |
| | | | 345/156 |
| 2015/0306496 A1* | 10/2015 | Haseltine | A63F 13/213 |
| | | | 463/31 |
| 2015/0375128 A1* | 12/2015 | Villar | A63H 30/02 |
| | | | 446/454 |
| 2016/0021199 A1 | 1/2016 | Krimon et al. | |
| 2016/0050204 A1 | 2/2016 | Anderson | |
| 2016/0310838 A1 | 10/2016 | Poisner et al. | |
| 2016/0361662 A1* | 12/2016 | Karunaratne | A63H 33/042 |
| 2016/0375354 A1 | 12/2016 | Francis et al. | |
| 2016/0375360 A1 | 12/2016 | Poisner et al. | |
| 2017/0023911 A1* | 1/2017 | Russell | G02B 27/2292 |
| 2017/0100662 A1* | 4/2017 | Scott | A63F 13/235 |

OTHER PUBLICATIONS

U.S. Appl. No. 15/294,884, entitled "Projections That Respond to Model Building", filed Oct. 17, 2016, 34 pages.
U.S. Appl. No. 15/185,241, entitled "Vision-Based Robot Control System", filed Jun. 17, 2016, 28 pages.

* cited by examiner

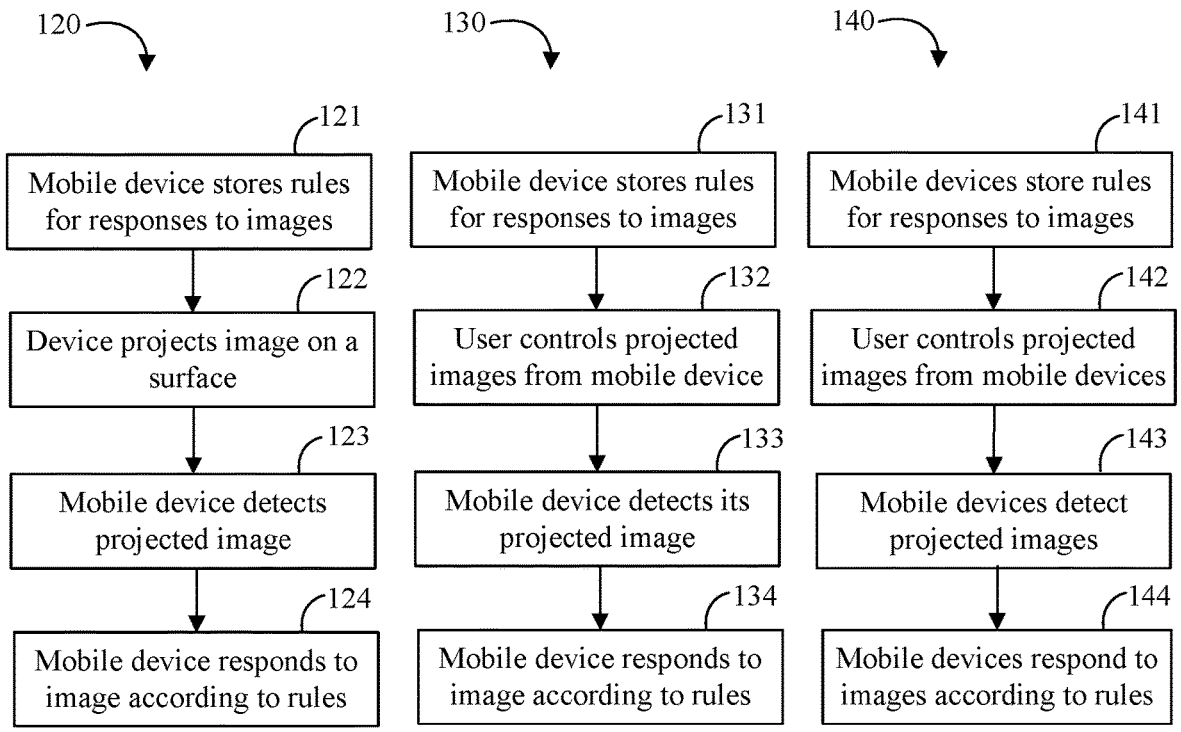
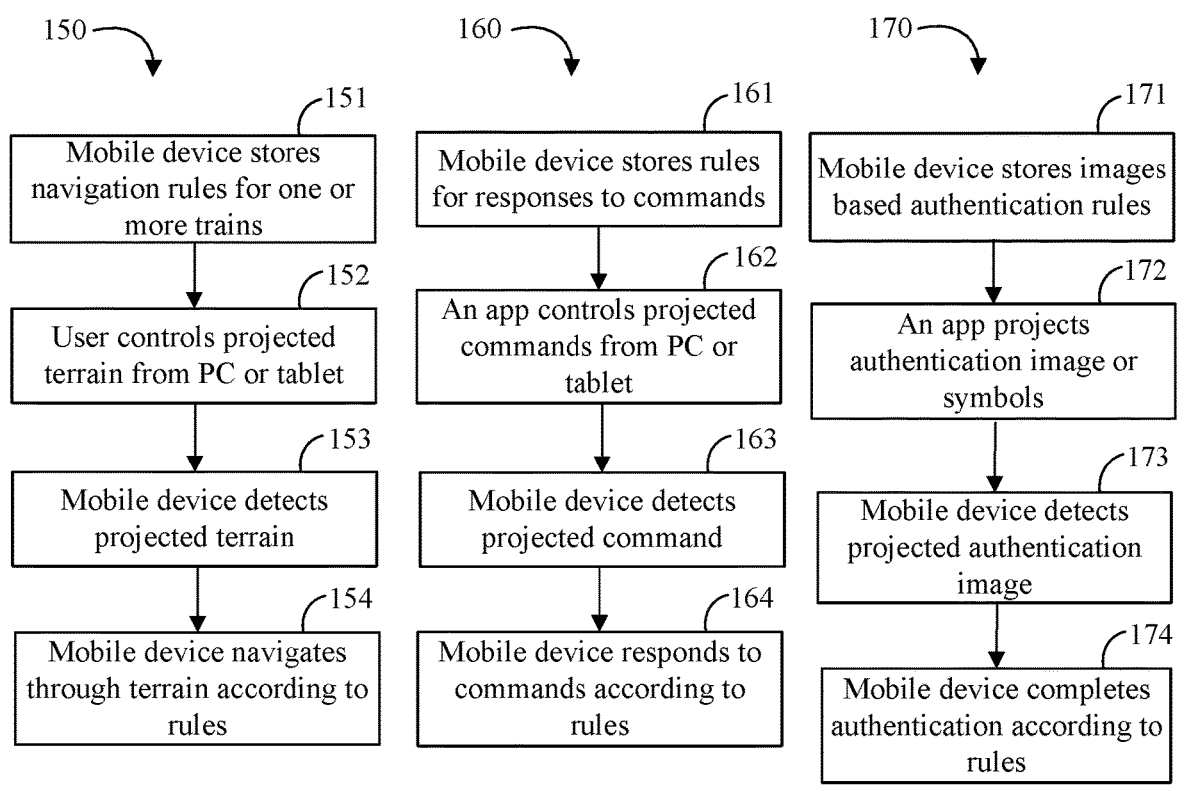

TOYS THAT RESPOND TO PROJECTIONS

TECHNICAL FIELD

Embodiments generally relate to interactive play systems. More particularly, embodiments relate to toys that respond to projections.

BACKGROUND

Remote control vehicles may provide entertainment and challenge by allowing users to control the actions of an object without direct manipulation. Machine vision may allow intelligent systems to interpret images in order to take actions. Some play systems may utilize projection as part of the play environment. Anki sells toy race cars, which may use an LED (light emitting diode) to illuminate markers on a track.

BRIEF DESCRIPTION OF THE DRAWINGS

The various advantages of the embodiments will become apparent to one skilled in the art by reading the following specification and appended claims, and by referencing the following drawings, in which:

FIG. 12 is a flowchart of an example of a method of interactive play according to an embodiment;

FIG. 13 is a flowchart of an example of a method of interactive play according to an embodiment;

FIG. 14 is a flowchart of an example of a method of interactive play according to an embodiment;

FIG. 15 is a flowchart of an example of a method of interactive play according to an embodiment;

FIG. 16 is a flowchart of an example of a method of interactive play according to an embodiment;

FIG. 17 is a flowchart of an example of a method of interactive play according to an embodiment.

DESCRIPTION OF EMBODIMENTS

Figure 1:
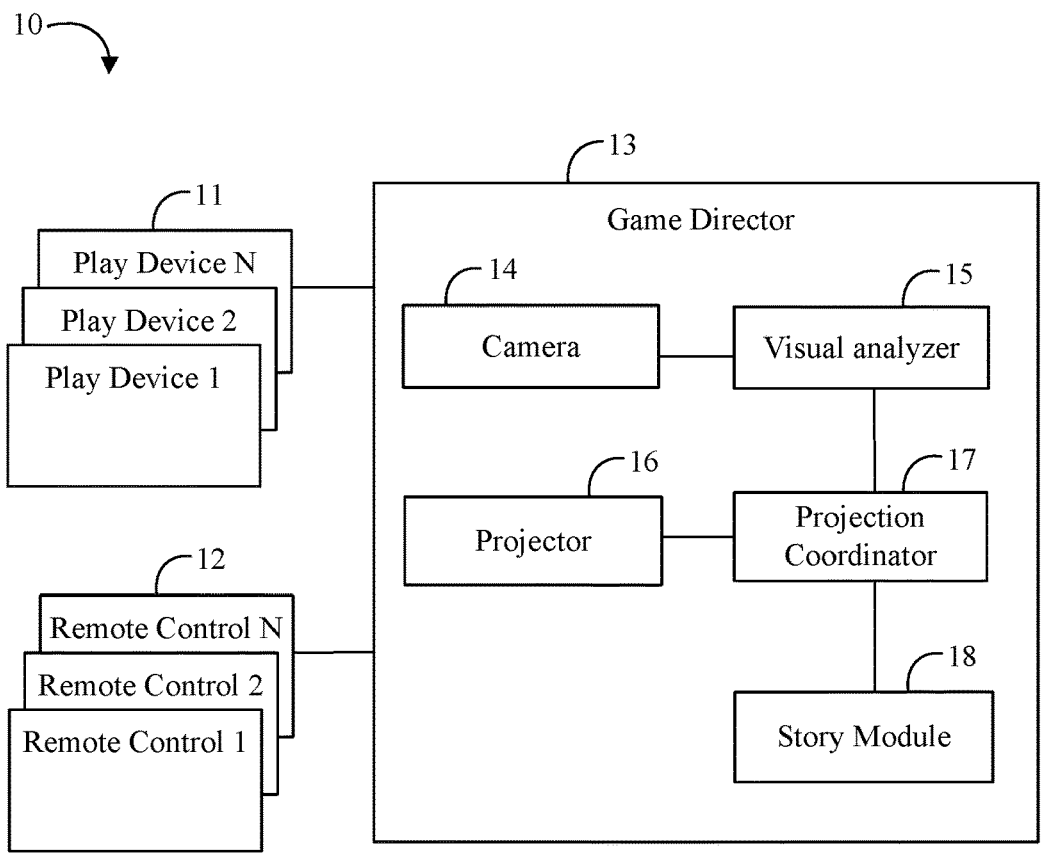
FIG. 1 is a block diagram of an example of an interactive play system according to an embodiment.

Turning now to FIG. 1, an embodiment of an interactive play system 10 may include one or more play devices 11, one or more remote control devices 12, and a game director 13 communicatively coupled to the one or more play devices 11 and the one or more remote control devices 12 to direct play between the one or more play devices 11. An embodiment of the game director 13 may include a camera 14 to capture images of a play area, a visual analyzer 15 communicatively coupled to the camera 14 to analyze the captured images, a projector 16 to project images on the play area, and a projection coordinator 17 communicatively coupled to the visual analyzer 15 and the projector 16 to coordinate images projected by the projector 16 in accordance with the directed play. Advantageously, the one or more play devices 11 may be further configured to respond to the images projected by the projector 16.

In some embodiments of the interactive play system 10, the game director 13 may be further configured to monitor and control actions of the play devices 11 (e.g. including movement of mobile play devices). Such control may be direct (e.g. through wired or wireless communications) or indirect (e.g. through projection of images intended to influence the response of the play devices 11). Some embodiments of interactive play system 10 may further include a story module 18 to provide a set of projections to direct play of the one or more play devices 11. As described in more detail below, at least one play device of the one or more play devices 11 may include a mobile play device having a device camera on the mobile play device to capture images, a device projector on the mobile play device to project images, and a projection responder communicatively coupled to the device camera and the device projector to respond to one or more of the game director, an image projected by the projector of the game director, or an image projected by the device projector based on a set of projection response rules.

Embodiments of each of the above play devices 11, remote controls 12, game director 13, visual analyzer 15, projection coordinator 17, story module 18, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 2:
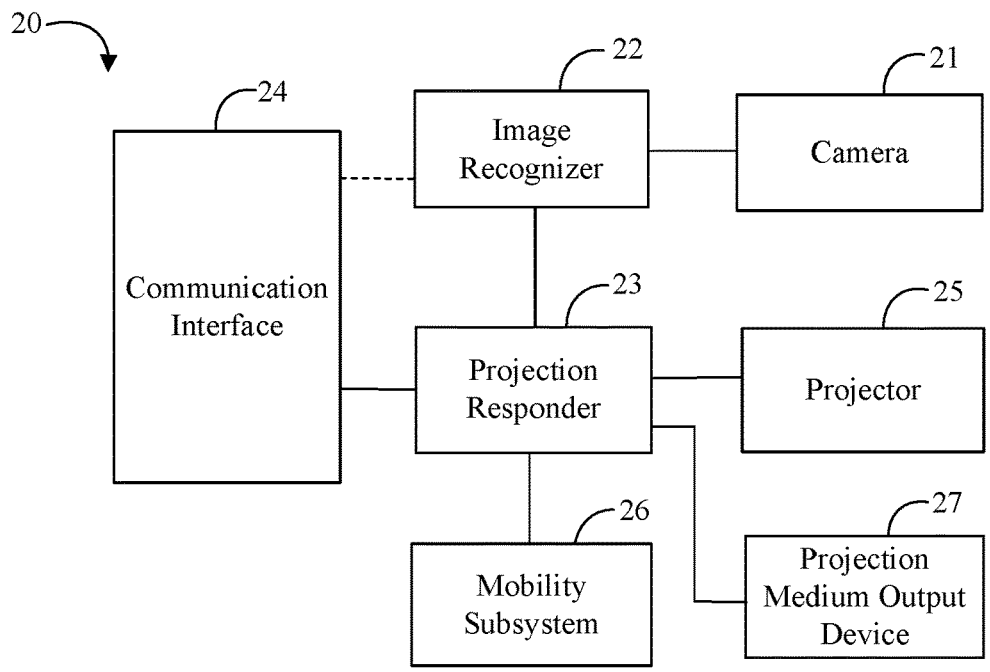
FIG. 2 is a block diagram of an example of an interactive play apparatus according to an embodiment.
Figure 3A:
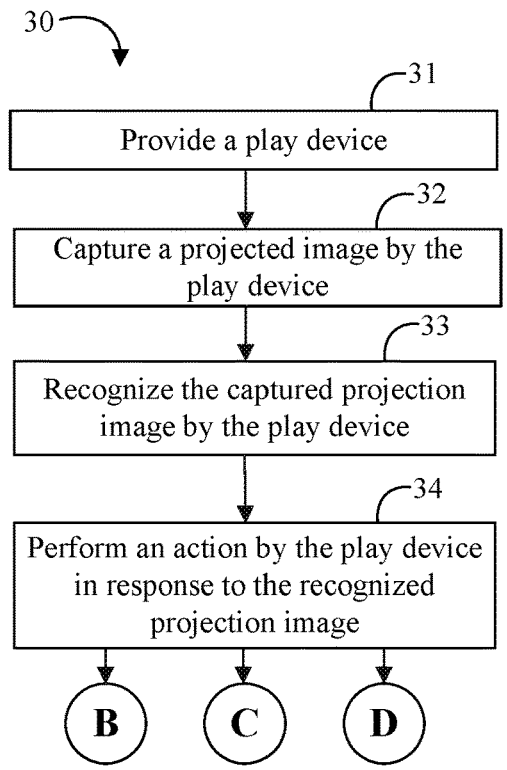
FIGS. 3A to 3D are flowcharts of an example of a method of interactive play according to an embodiment.
Figure 3B:
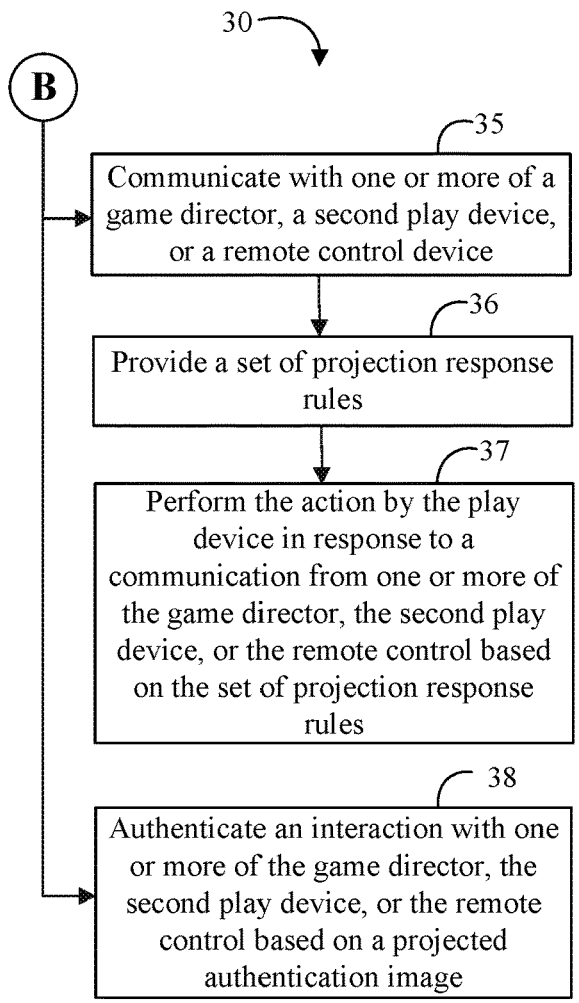
Figure 3C:
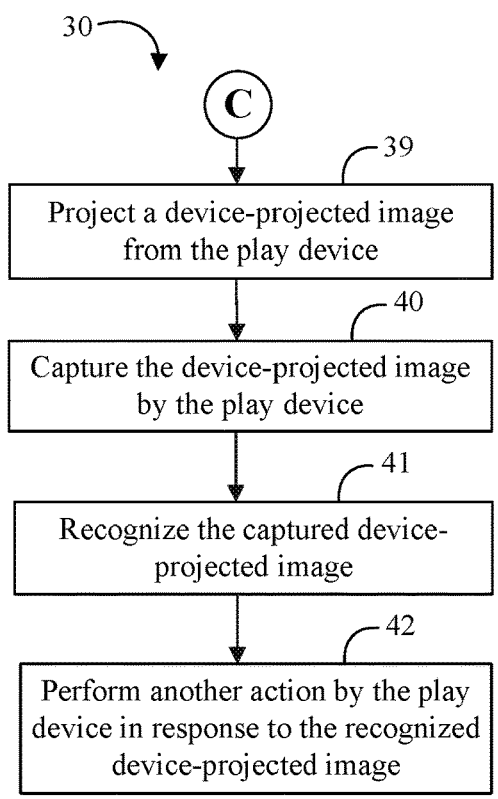
Figure 3D:
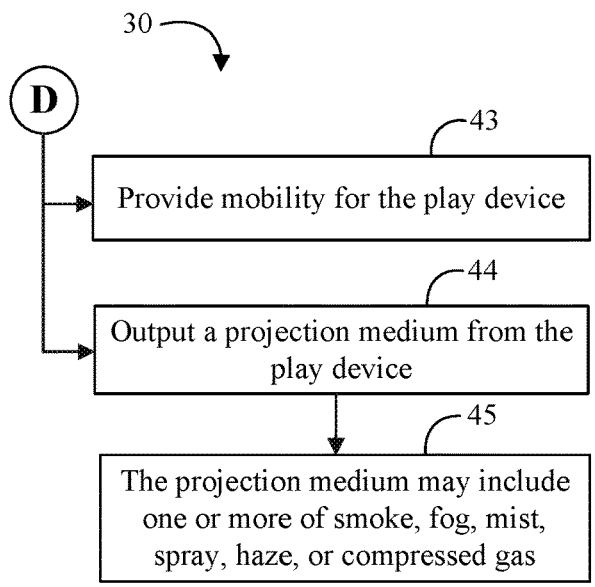

Turning now to FIG. 2, an embodiment of an interactive play apparatus 20 may include a camera 21 to capture a projected image, an image recognizer 22 communicatively coupled to the camera 21 to recognize the captured projection image, and a projection responder 23 communicatively coupled to the image recognizer 22 to respond to the recognized projection image. The interactive play apparatus 20 may optionally further include a communication interface 24 communicatively coupled to the projection responder 23 to communicate with one or more of a game director, a play device, or a remote control device. For example, the projection responder 23 may be further configured to respond to one or more of the game director, the play device, or the remote control based on a set of projection response rules. In some embodiments of the interactive play apparatus 20, the projection responder may also be configured to authenticate an interaction with one or more of the game director, the play device, or the remote control based on a projected authentication image.

Some embodiments of the interactive play apparatus 20 may optionally further include a projector 25 communicatively coupled to the projection responder 23 to project an image selectively identified by the projection responder 23. The apparatus 20 may further include a housing to house one or more of the camera, the image recognizer, or the projection responder, with the projector mechanically coupled to one of the housing, the remote control device, or the game director. The interactive play apparatus 20 may also further include a mobility subsystem 26 to provide mobility for the interactive play apparatus 20 and/or a projection medium output device 27 to output a projection medium. For example, the projection medium may include one or more of smoke, fog, mist, spray, haze, or compressed gas. For example, the mobility subsystem may include a motor and wheels (e.g. for a play car) and/or propellers (e.g. for a play helicopter, drone, or boat). Non-limiting examples of non-mobile play devices may include a control tower (e.g. for an airport play set), a bridge tower, a tunnel, a stadium or bleachers, a building (e.g. a barn for a farm play set), and other structures that may ordinarily be stationary in a given play context.

Embodiments of each of the above image recognizer 22, projection responder 23, communication interface 24, and other components of the interactive play apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages.

Turning now to FIG. 3, an embodiment of a method 30 of interactive play may include providing a play device at block 31, capturing a projected image by the play device at block 32, recognizing the captured projection image by the play device at block 33, and performing an action by the play device in response to the recognized projection image at block 34. Some embodiments of the method 30 may further include communicating with one or more of a game director, a second play device, or a remote control device at block 35, providing a set of projection response rules at block 36, and performing the action by the play device in response to a communication from one or more of the game director, the second play device, or the remote control based on the set of projection response rules at block 37. The method 30 may further include authenticating an interaction with one or more of the game director, the second play device, or the remote control based on a projected authentication image at block 38.

In some embodiments, the method 30 may further include projecting a device-projected image from the play device at block 39, capturing the device-projected image by the play device at block 40, recognizing the captured device-projected image at block 41, and performing another action by the play device in response to the recognized device-projected image at block 42. The method 30 may further include providing mobility for the play device at block 43 and/or outputting a projection medium from the play device at block 44. For example, the projection medium may include one or more of smoke, fog, mist, spray, haze, or compressed gas at block 45.

Embodiments of the method 30 may be implemented in an interactive play system or interactive play apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages. For example, the method 30 may be implemented on a computer readable medium as described in connection with Examples 18 to 24 below.

Projectors have been made small enough to incorporate into play systems and play devices. For example, pico projectors, light emitting diode (LED) projectors, and laser projectors may provide size and cost effective projection in a smart toy. Advantageously, some embodiments of a system, apparatus and method for interactive play may include the capability to track objects and receive data from those objects to create a new kind of play when projection is added. In some embodiments, projections can advantageously control the actions of mobile devices (e.g. including a feedback control loop with camera input). For example, in some embodiments the projection itself directs the mobile device.

Figure 4A:
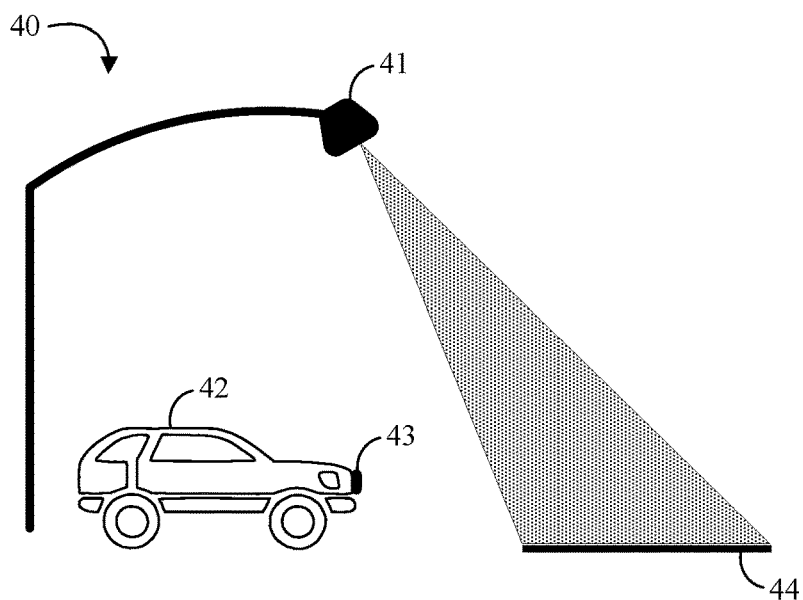
FIGS. 4A and 4B are illustrations of an example of a system, apparatus, and method for interactive play according to an embodiment.
Figure 4B:
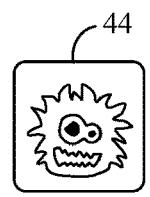

Some features and advantages of various embodiments of a system, apparatus and method for interactive play may be better understood through some non-limiting illustrative examples. Turning now to FIGS. 4A and 4B, an embodiment of an interactive play system 40 may include a projector 41 and a mobile play device (e.g. a robotic smart toy car 42). The projector 41 may be an overhead projector. The smart toy car 42 may include a camera 43. A game director (not shown) may include a projection coordinator which causes the projector 41 to project images which the smart toy car 42 may encounter in the play area. The camera 43 on the smart toy car 42 may detect a projected image (e.g., from the projector 41) and the smart toy car 42 may move or take some other action according to some aspect of the projection (e.g., a command, a projected terrain to guide movement). For example, the smart toy car 42 may include an image recognizer to recognize the projected image and a projection responder to respond to the recognized projection. For example, a projected monster 44 (see FIG. 4B) may "scare" the smart toy car 42 away from the projected monster 44. The image recognizer may, for example, recognize the image 44 from a library of images and the projection responder may cause the smart toy car 42 to backup or turn away based on an action or actions associated with the image in the library (e.g. making the car 42 appear to be "scared" of the monster). Where the image is to be projected at an angle, the game director or projector 41 may include keystone correction to have the image appear undistorted on the projection surface.

Figure 5A:
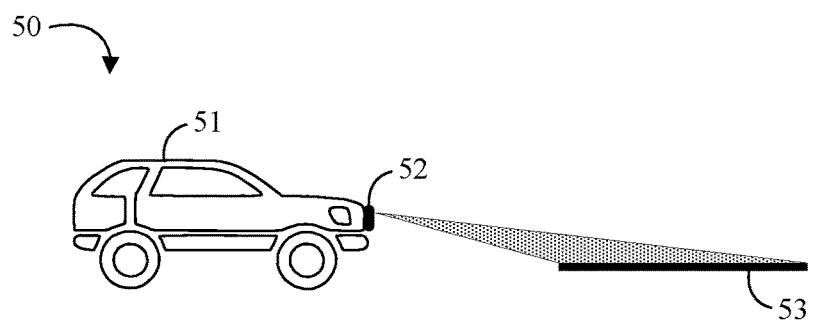
FIGS. 5A and 5B are illustrations of another example of a system, apparatus, and method for interactive play according to an embodiment.
Figure 5B:
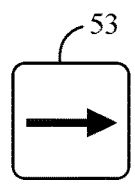

Turning now to FIGS. 5A and 5B, an embodiment of an interactive play system 50 may include a mobile play device (e.g. a robotic smart toy car 51). The smart toy car 51 may include a combination camera/projector device 52. The projector may be a pico projector. A game director (not shown) may include a projection coordinator which causes the camera/projector device 52 to project images from the smart toy car 51 (e.g., as illustrated, in front of the smart toy car 51). Additionally, or alternatively, a user may have a remote control device (e.g. such as a smartphone) with an application (e.g. an app) to cause the smart toy car 51 to project selected images. The camera portion of the camera/projector device 52 on the smart toy car 51 may detect a projected image and the smart toy car 51 may move or take some other action according to some aspect of the projection (e.g., a command, a projected terrain to guide movement). For example, the smart toy car 51 may include an image recognizer to recognize the projected image and a projection responder to respond to the recognized projection.

In accordance with some embodiments of the interactive play system 50, a projection from a mobile device may control its own movement (e.g., as a result of user remote control of the mobile device's projection content). In this example, the smart toy car 51 may project an image and the smart toy car 51 may respond to its own projected image (e.g. creating a feedback control loop). For example, the user may choose an arrow image 53 (see FIG. 5B) to be projected from the smart toy car 51, and the smart toy car 51 may turn in the direction that the arrow image 53 indicates (i.e. the play device follows its own projected arrow). For example, a machine vision system may recognize the arrow image 53 as a directional arrow and the projection responder may cause the wheels of the smart toy car to turn in the direction of the arrow. Again, where the image is to be projected at an angle, the smart toy car 51 and/or the camera/projector device 52 may include keystone correction to have the image appear undistorted on the projection surface (and/or to aid in image recognition).

Figure 6A:
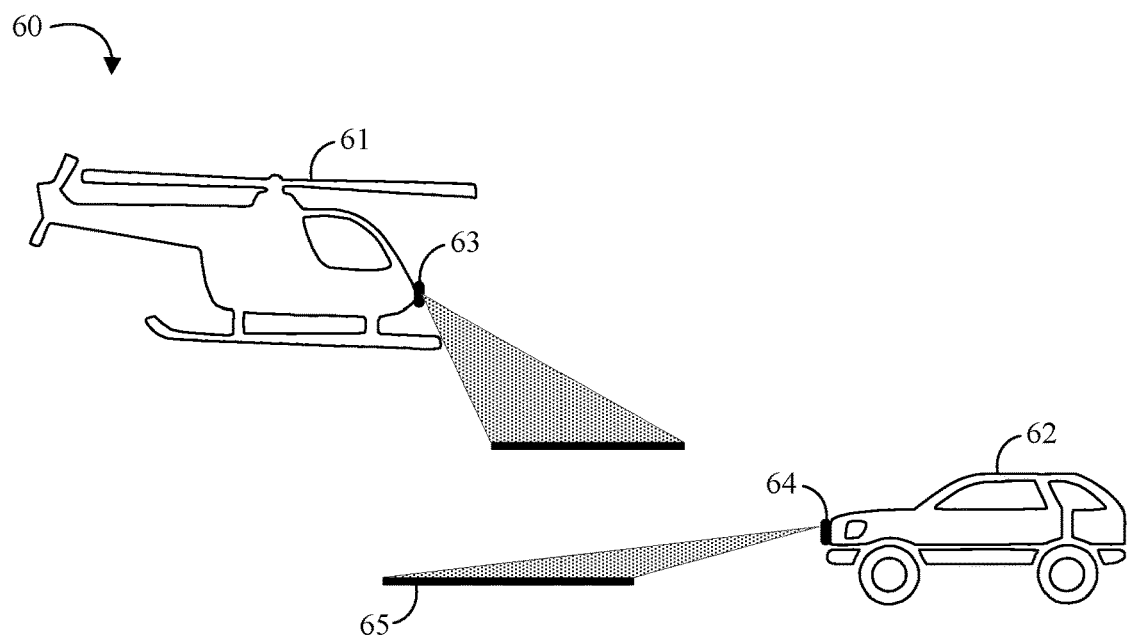
FIGS. 6A and 6B are illustrations of another example of a system, apparatus, and method for interactive play according to an embodiment.
Figure 6B:
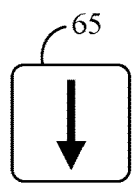

Turning now to FIGS. 6A and 6B, an embodiment of an interactive play system 60 may include multiple mobile play devices (e.g. robotic smart toy helicopter 61 and car 62). The smart toy helicopter 61 and car 62 may each include respective combination camera/projector devices 63 and 64 (e.g. with keystone correction). The projectors may be pico projectors. A game director (not shown) may include a projection coordinator which causes the camera/projector devices 63 and 64 to project images from the smart toy helicopter 61 and car 62 (e.g., as illustrated, in front of the smart toys, but additionally or alternatively from behind the smart toys). The camera portion of the camera/projector devices 63 and 64 on the smart toy helicopter 61 and car 62 may detect a projected image and the smart toy helicopter 61 and car 62 may move or take some other action according to some aspect of the projection (e.g., a command, a projected terrain to guide movement). For example, the smart toy helicopter 6 1and car 62 may each include an image recognizer to recognize the projected image and a projection responder to respond to the recognized projection.

In the example of FIGS. 6A and 6B, a mobile device may project an image that controls another mobile device (e.g., as a result of user remote control of the mobile device's projection content). For example, the remote control smart toy helicopter 61 and car 62 may each have projectors, which users separately control. For example, the users may send projections to a surface to influence actions of the other smart toy. For example, the smart toys may follow each other's projections. The smart toy car 62 may project an image of directional arrow 65 which the smart toy helicopter 61 may detect and respond to by changing its flight direction to follow the directional arrow 65. In one embodiment, the users may race the smart toys and try to disrupt each other with projections. For example, the camera/projector devices may be relatively wide angle such that they can project and capture images well in front of and also to the side of the smart toys. With two smart toys racing side-by-side, each could project images into the path of the other smart toy. Such images could be obstacles or oil slicks or the like which the other smart toy has to avoid over the course of the race. Additionally, or alternatively, such obstacles may also be projected from the game director by an overhead projector.

Figure 7:
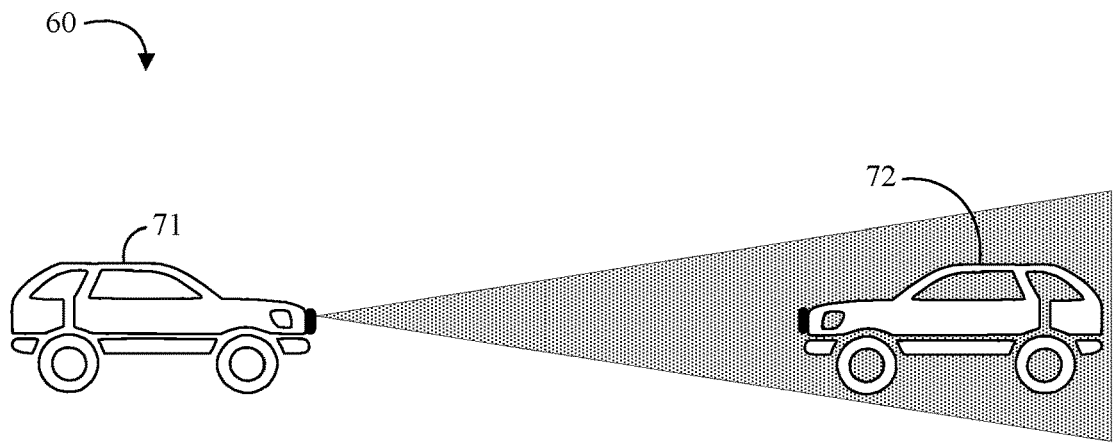
FIG. 7 is an illustration of another example of a system, apparatus, and method for interactive play according to an embodiment.

Turning now to FIG. 7, an example of an embodiment of the system 60 includes an example where two smart toy cars 71 and 72 may project on each other. For example, smart toy car 71 may project smoke or fire onto smart toy car 72 after a crash (e.g. a real or virtual crash as sensed by motion sensors or an overhead camera). Advantageously, in some embodiments a projection may have a meaning or context that can be seen and interpreted by users (e.g. in addition to the machine interpretation). In one embodiment, for example, the smart toy car 71 may project an image (e.g., like a scary face) to give a signal, which the user(s) can also observe, to the other smart toy car 72. In another embodiment, the smart toy cars 71 and 72 may project images on to each other to trigger special effects.

Advantageously, some embodiments may involve authenticating an interaction with one or more of the game director, other play devices, or remote control devices based on a projected authentication image. For example, the authentication image may be any of a bar code, a QR symbol, a text code, a user supplied image, and/or any other image and/or symbol which may serve as a key to establish a trusted interaction between the devices. A complimentary application, for example, may run on an external client device (e.g. a personal computer (PC), tablet, smartphone, etc.) to select or provide a projection to authenticate itself to the game director and/or play device. In some embodiments, the play device may operate and/or interact with other parts of the play system only when the play device first recognizes a projected authentication image or symbol. In some embodiments the projection-based authentication may be utilized in combination with more extensive authentication or security protocols (e.g. over a wireless communication network).

Figure 8:
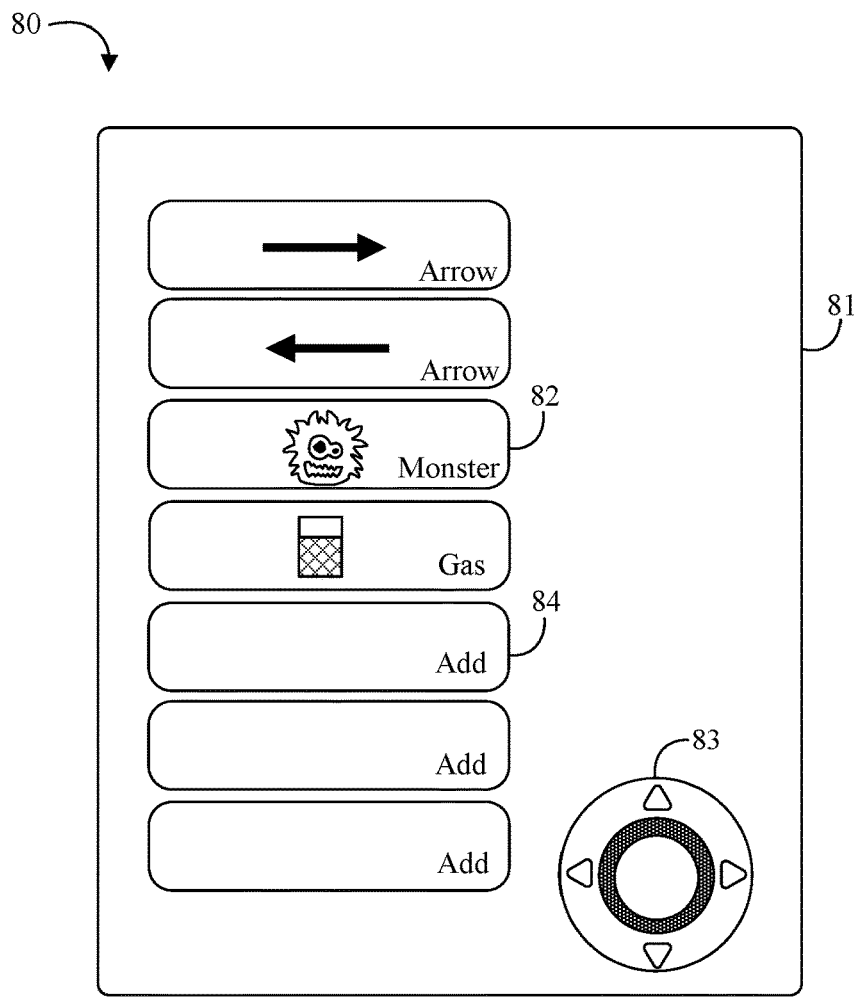
FIG. 8 is an illustration of an example user interaction interface according to an embodiment.

Turning now to FIG. 8, an embodiment of a remote control user interface may allow the user to easily select images for projection. A remote control device 80 may include a touch screen display 81 to provide a user interaction interface. A complimentary application running on the remote control device 80 may establish wired or wireless communication with a game director, one or more play devices, and/or one or more other remote control devices. The application may present a selection palette with one or more images 82 the user can touch to cause a play device to project that image. The user interaction interface may include a navigation interface 83 to navigate through various menus or selection palettes. The application may allow the user to touch a display button 84 to add additional images to the selection palette. Non-limiting examples of suitable remote control devices to implement the complimentary application and/or user interaction interface include a personal computer (PC), a tablet computer, a wearable smart device, and a smartphone.

Figure 9:
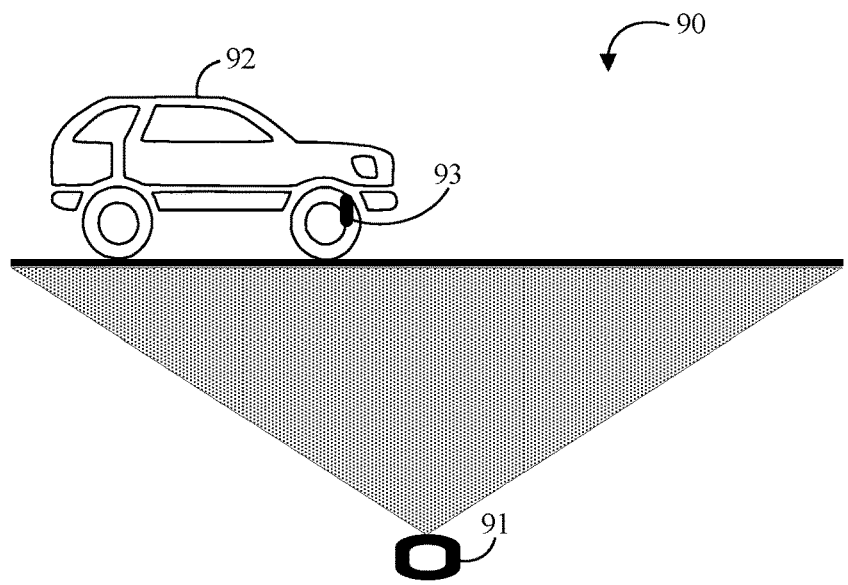
FIG. 9 is an illustration of another example of a system, apparatus, and method for interactive play according to an embodiment.

Turning now to FIG. 9, an embodiment of an interactive play system 90 may include a projector 91 and a mobile play device (e.g. a robotic smart toy car 92). The projector 91 may be a back projector (e.g. a projector that projects from behind a projection surface). The smart toy car 92 may include a camera 93. A game director (not shown) may include a projection coordinator which causes the projector 91 to project images which the smart toy car 92 may encounter in the play area that includes the back projection surface. The camera 93 on the smart toy car 92 may detect a projected image (e.g., from the projector 91) and the smart toy car 92 may move or take some other action according to some aspect of the projection (e.g., a command, a projected terrain to guide movement). For example, the smart toy car 92 may include an image recognizer to recognize the projected image and a projection responder to respond to the recognized projection. For example, the projector 91 projects an image from beneath the surface that the smart toy car 92 is on. Advantageously, some embodiments of the system 90 may make a common transparent or translucent surface into an interactive surface. For example, the smart toy car 92 may follow a route projected from beneath. Advantageously, some embodiments of the system 90 may provide a low cost, large play area (e.g. less expensive as compared to a similarly sized flat panel display).

Figure 10:
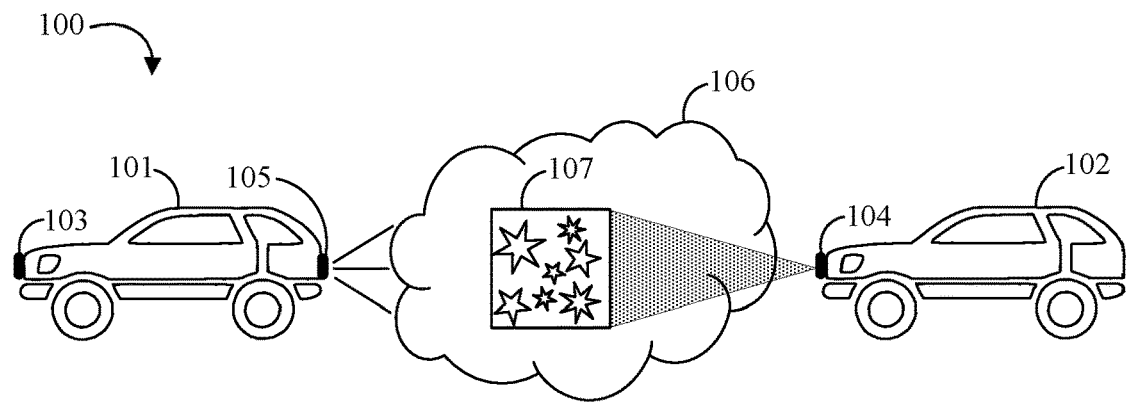
FIG. 10 is an illustration of another example of a system, apparatus, and method for interactive play according to an embodiment.

Turning now to FIG. 10, an embodiment of an interactive play system 100 may include multiple mobile play devices (e.g. robotic smart toy cars 101 and 102). The smart toy cars 101 and 102 may each include respective combination camera/projector devices 103 and 104 (e.g. with keystone correction). The projectors may be pico projectors. A game director (not shown) may include a projection coordinator which causes the camera/projector devices 103 and 104 to project images from the smart toy cars 101 and 102 (e.g., as illustrated, in front of the smart toy cars, but additionally or alternatively from on top of, on the side of, and/or behind the smart toy cars). Additionally, or alternatively, the smart toy cars 101 and 102 may respond to each other's projections and/or their own projections. Advantageously, the smart toy car 101 may include a projection medium output device 105 to output a projection medium 106. For example, the projection medium 106 may include one or more of smoke, fog, mist, spray, haze, or compressed gas. In some embodiments of the system 100, another projection medium output device may additionally, or alternatively, be placed in the play area or environment with the play devices (e.g. not on the play devices themselves). The smart toy car 102 may project an image 107 on the projection medium 106. For example, the projected image 107 may include simulated flames, magical creatures (e.g. a genie), and/or shifting sparkles that are the result of a magic spell (e.g. in the play context). Similarly, based on a camera in the play area recognizing the close proximity (or collision) of the projection medium 106 or the image 107 projected on the projection medium 106 with another object, the play device(s) may take a specific action. For example, if a simulated flame projected on the projection medium 106 appears to contact a second play device, the second play device may respond with an appropriate action for the context of the play.

An embodiment of a projection medium output device may include a device which provides a chemical smoke-like reaction. For example, a container may hold a dry ice cube, a water dispenser may drip relatively warmer water onto the dry ice cube under electronic control, and an electronically controlled fan may dispense the resulting medium and/or disperse the resulting medium in the play environment. Another embodiment of a projection medium output device may include a fog machine or a haze machine. A miniature fog device may include components similar to an electronic cigarette. For example, a relatively small container may hold a suitable smoke solution (e.g. propylene glycol or food grade vegetable glycerin) in contact with a heating element via a wicking material like cotton, the heating element may heat up under electronic control to vaporize the solution, and an electronically controlled fan, air pump, and/or pressurized air canister may dispense the resulting medium and/or disperse the resulting medium in the play environment. Another embodiment of a projection medium output device may include an aerosol spray canister with an electronically controlled valve. The canister is pressurized such that electronically opening the valve will cause the medium to dispense and disperse. Other pressurized air or gas canisters with similar electronically controlled valves may also be suitable as long as the contents are non-toxic and the presence of the contents dispersed into the play environment provides sufficient contrast with the environment air to support an image display or effect.

Figure 11A:
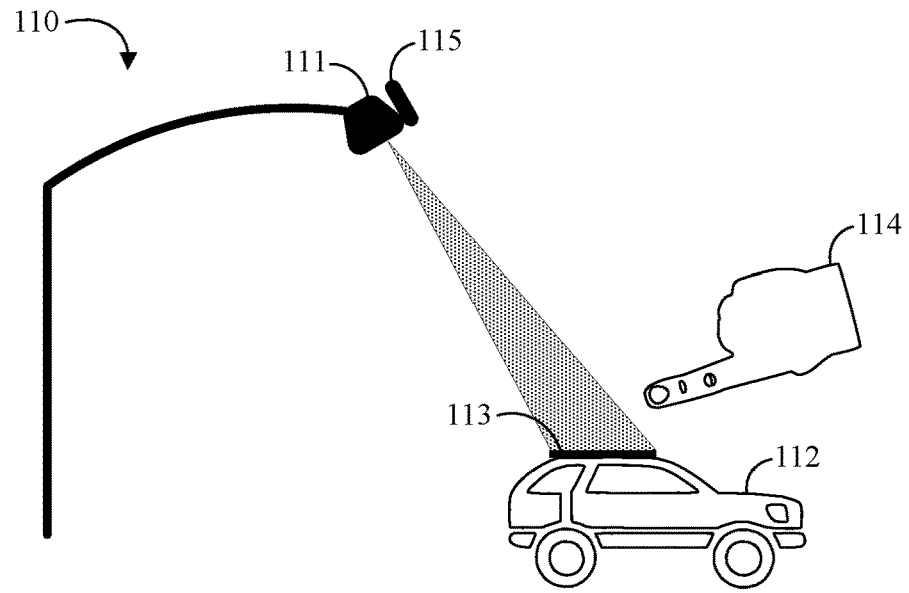
FIGS. 11A and 11B are illustrations of another example of a system, apparatus, and method for interactive play according to an embodiment.
Figure 11B:
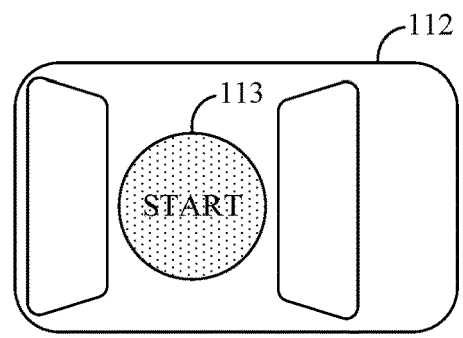

Turning now to FIGS. 11A and 11B, an embodiment of an interactive play system 110 may include a projector 111 and a mobile play device (e.g. a robotic smart toy car 112). The projector 111 may be an overhead projector. A game director (not shown) may include a projection coordinator which causes the projector 111 to project images which the smart toy car 112 may encounter in the play area. In this example, a projection on the smart toy car 112 may become an interactive touch surface. For example, the overhead projector 111 may project a button 113 (see FIG. 11B) on the top or side of the smart toy car 112, and the user 114 can touch that projected button 113 to cause a sound effect (e.g. starting the car engine) or some other action. For example, the system 110 may include a three-dimensional (3D) camera 115 for gesture recognition and/or may utilize one or more of the play device cameras and/or other game director cameras to determine when the user 114 touches the projected button 113.

Turning now to FIG. 12, an embodiment of a method 120 of interactive play may include a play device storing rules for responses to images at block 121, another device projecting an image on a surface at block 122, the play device detecting the projected image at block 123, and the play device responding to the detected image according to the stored rules at block 124. For example, the play device may include a mobile device. For example, block 122 may correspond to projecting from above or below the play surface.

Turning now to FIG. 13, an embodiment of a method 130 of interactive play may include a play device storing rules for responses to images at block 131, a user remotely controlling an image projected from the play device at block 132, the play device detecting its own projected image at block 133, and the play device responding to the detected image according to the stored rules at block 134. For example, the play device may include a mobile device. For example, block 134 may correspond to responding to projections from the same mobile device making the projections.

Turning now to FIG. 14, an embodiment of a method 140 of interactive play may include two or more play devices storing rules for responses to images at block 141, two or more users remotely controlling respective images projected from the two or more play devices at block 142, each of the two or more play devices detecting an image projected from another play device at block 143, and the two or more play devices responding to the detected images according to the stored rules at block 144. For example, the play devices may include mobile devices. For example, block 144 may correspond to the mobile devices responding to projections from another mobile device.

Turning now to FIG. 15, an embodiment of a method 150 of interactive play may include a play device storing rules for one or more terrains at block 151, a user remotely controlling a projected terrain at block 152 (e.g. from a PC, a tablet, or a smartphone), the play device detecting the projected terrain at block 153, and the play device navigating through the detected terrain according to the stored rules at block 154. For example, the play device may include a mobile device. For example, block 152 may correspond to projecting terrain selected by a complimentary application or app.

Turning now to FIG. 16, an embodiment of a method 160 of interactive play may include a play device storing rules for response to one or more commands at block 161, remotely controlling a projected command at block 162 (e.g. from a PC, a tablet, or a smartphone), the play device detecting the projected command at block 163, and the play device responding to the detected command according to the stored rules at block 164. For example, the play device may include a mobile device. For example, block 162 may correspond to remotely controlling the projected command by a complimentary application or app.

Turning now to FIG. 17, an embodiment of a method 170 of interactive play may include a play device storing image based authentication rules at block 171, projecting an authentication image or symbol at block 172 (e.g. from a PC, a tablet, or a smartphone), the play device detecting the projected authentication image at block 173, and the play device completing the authentication according to the stored rules at block 174. For example, the play device may include a mobile device. For example, block 172 may correspond to remotely providing the authentication image or symbol by a complimentary application or app.

Figure 18:
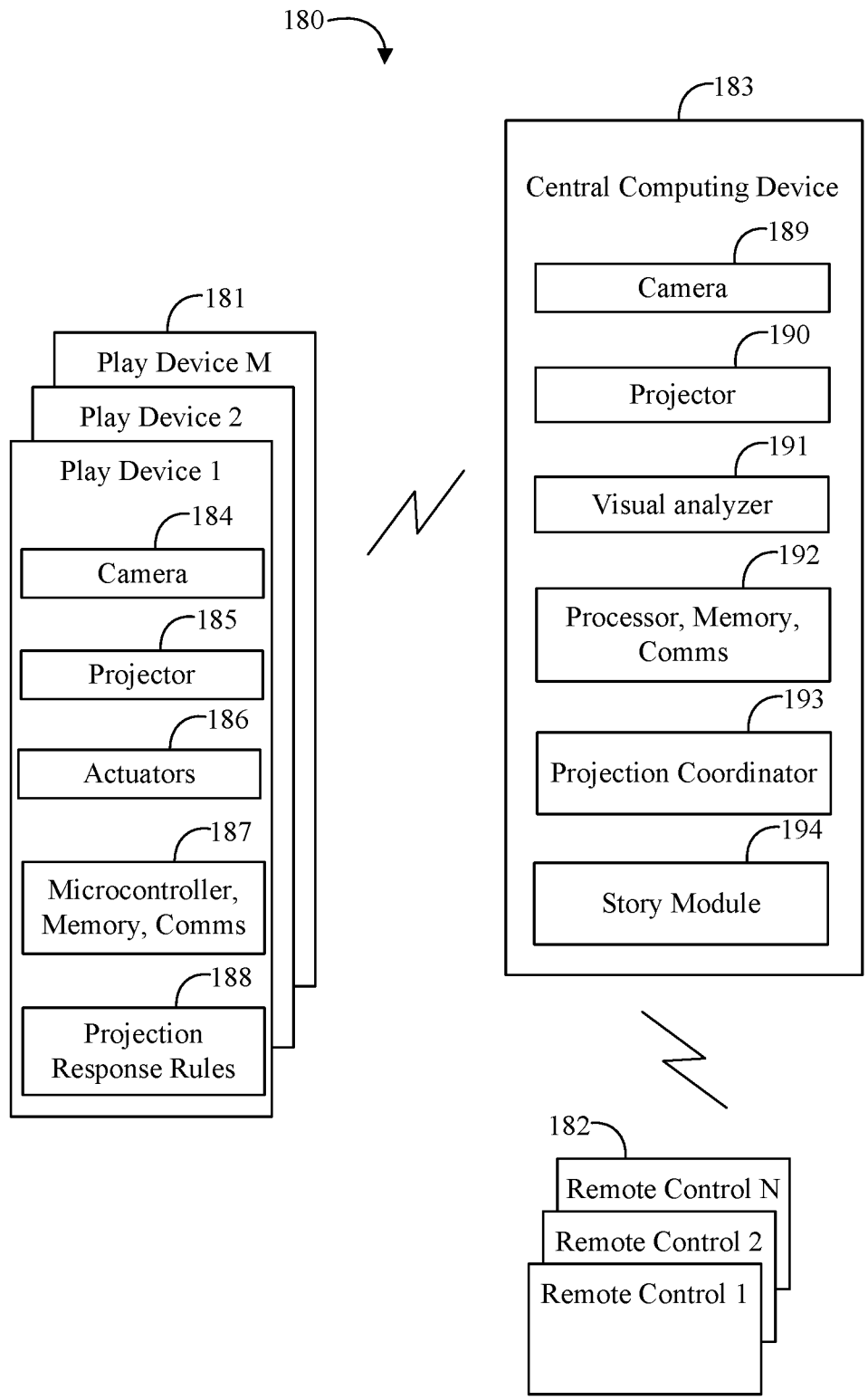
FIG. 18 is a block diagram of an example of an interactive play system according to an embodiment.

Turning now to FIG. 18, an embodiment of an interactive play system 180 may include one or more play devices 181, one or more remote control devices 182, and a central computing device 183 communicatively coupled to the play devices 181 and the remote control devices 182. For example, the play devices 181 may include mobile play devices. For example, the remote control devices 182 (e.g., apps on PCs, tablets or smartphones) may drive various projection behaviors. Advantageously, some embodiments of the interactive play system may be further configured to monitor and control actions of the play devices 181 (e.g. including movement of mobile play devices). Such control may be direct (e.g. through wired or wireless communications) or indirect (e.g. through projection of images intended to influence the response of the play devices 181).

The play devices 181 may include smart computing devices having one or more two dimensional (2D) cameras, camera arrays, and/or 3D cameras 184, one or more projectors 185, one or more actuators 186 (e.g., motors, wheels, propellers, speakers, haptic devices, solenoids, valves, etc.), and computing components 187 (e.g. a processor or microcontroller, memory, and communications including wireless connectivity). Advantageously, one or more of the play devices 181 may further include stored projection response rules 188. Projections may be visible to the human eye (e.g., red-green-blue (RGB) wavelengths) and/or just visible to the visual sensor/camera on the mobile device (e.g., ultraviolet (UV) or infrared (IR) wavelengths).

In some embodiments of the interactive play system 180 the central computing device 183 may be incorporated as one of the play pieces with integrated camera(s) 189 and projector(s) 190 (e.g. a contextual play structure with the cameras/projectors positioned above the surface of the mobile devices). In most embodiments, the central computing device 183 may be a stationary computing device. In some embodiments of the interactive play system 180, the central computing device 183 may include separate but communicatively coupled components such as a separate computing device (e.g. a PC or game console), one or more separately positioned 2D and/or 3D cameras 189, and one or more separately positioned projectors 190 (e.g. one may be positioned on a ceiling over the play area).

The central computing device 183 may include a camera interface that may include cameras 189 or interfaces to cameras that may be peripherally attached or integrated into the system 180 (e.g. including play device cameras 184). The cameras may be communicatively coupled with the camera interface via a wired or wireless connection suitable for transmitting data captured by cameras. The cameras may include a 3D camera or camera array to capture both depth and color information. For example, in some embodiments, the cameras may incorporate a depth sensor, such as, an infrared emitter utilized in combination with an infrared camera, as well as a 2D image capture sensor, such as a RGB camera sensor. Generally, the cameras may have 2D or three-dimensional (3D) image capture capabilities and may be embodied as a 3D camera, depth camera, or bifocal camera, and/or be otherwise capable of generating a depth image, channel, or stream. The cameras may include a still camera, a video camera, a webcam, an infrared (IR) camera, or other device or devices capable of capturing video and/or images.

The central computing device 183 may further include a visual analyzer 191 including object recognition and tracking visual analytics that can be used to identify and track objects in the play area (e.g. including stationary and mobile play devices). The central computing device 183 may further include computing components 192 (e.g. a processor, memory, and communications including wireless connectivity). For example, various components of the central computing device 183, including the visual analyzer 191, may be implemented as a set of instruction stored in memory which are to be executed by the processor.

For example, the computing components 192 may include a communication interface that can communicate over wired or wireless interfaces with the play devices 181, the remote control devices 182 and/or the various camera/projection devices. Non-limiting examples of suitable wired interfaces include Universal Serial Bus (USB). Non-limiting examples of suitable wireless interfaces include WiFi, Bluetooth, Bluetooth Low Energy, ANT, ANT+, ZigBee, Radio Frequency Identification (RFID), and Near Field Communication (NFC). Other wired or wireless standards or proprietary wired or wireless interfaces may also be used.

The communication interface may also send audio information so that audio speakers can present aural effects. The communication interface may send parameters for other devices to use in determining projected images or it may send completely rendered graphical effects ready for projection or some other form of data depending on how computing tasks are distributed. There may be multiple interfaces with each device. In one example, the system 180 may communicate over WiFi to send detailed parameters regarding projections. The system 180 may also communicate over Bluetooth to send user commands and/or to receive audio to play through the system 180.

The visual analyzer 191 may include an image/object recognition module that uses 2D/3D camera input to identify the play devices 181 and their respective locations (and other characteristics). The visual analyzer 191 may further include an object segmenter (e.g. to identify segmented portions of a captured image based on edge tracing), an object recognizer to recognize the segmented portions of the captured images, and an object tracker to track movement of objects. For example, the various camera devices may 2D cameras, 3D cameras, and/or depth cameras that enable object recognition through the visual analytics that can be used to determine data corresponding to the type of the play devices 181, the state of the play devices 181 (e.g. moving or stationary), and various characteristics. Some play devices 181 may include markers that can be recognized by the camera and facilitate an identification and tracking process. The markers may or may not be visible by human eyes. The interactive play system 180 may further include a play device store of play device models and shapes to allow comparison for recognition of the play devices 181 and other objects. The object tracker may be configured to track where an object is located in the play area and also anticipated future locations (e.g. based on speed and trajectory). The object tracker may, for example, track an object as it moves across the play area and track the locations of other objects or play devices that are near the object. The location information for the object may be combined with information from the visual analyzer to aid in the superposition of projections over the play area.

Advantageously, embodiments of the interactive play system 180 may further include a projection coordination store to store a database of projection content with rules for how to coordinate respective projections. For example, projected terrain for play cars, projected water for play boats, projected fire for detected real or virtual crashes (e.g. a collision between a play device and a projected obstacle), projected obstacles, etc. Advantageously, embodiments of the interactive play system 180 may further include a projection coordinator 193 that controls the timing and type of projections based on, among other things, the projection coordination store. The projection coordinator may also control the timing and type of projections based on a meaning or contextual interpretation of the play devices 181 and/or play area. For example, the visual analyzer 191 may operate independently or jointly with the projection coordinator 193.

Various components of the interactive play system 180 may be connected either through a local network or a cloud-based connection. For example, image capture may be performed locally, while the play device store and visual analyzer 191 may be on the cloud. Likewise, the projection coordination store may be stored on the cloud. The system 180 may optionally include sensory effect devices and a projection-effect coordinator to output effects along with the projections (e.g. identifying suitable effects from an appropriate database of effects).

An embodiment of the central computing device 183 may further include a plurality of input interfaces such as, for example, a gesture recognition interface, a touch interface, a voice interface, a facial expression interface, and an eye tracking interface. The gesture recognition interface may be configured to recognize and track hand and arm gestures of a user. The gesture recognition interface may be used to recognize hands, fingers, finger gestures, hand movements and a location of hands relative to various camera locations. For example, the gesture recognition interface may determine that a user made a body part gesture to drop or throw an object onto the scene and the projection coordinator may cause a corresponding projection of the thrown object. Likewise, the user may make a body part gesture to move a projected object from one location or another. The gesture recognition interface may be coupled to a camera or camera array, a microphone or microphone array, a touch screen or touch surface, or a pointing device, or some combination of these items, to detect gestures and commands from the user.

For example, the gesture recognizer may include a touch screen sensor or touch surface, a rear camera, and/or a front camera. Data from the sensors and/or cameras may be fed to hardware, software, firmware or a combination of the same to map the gesture from the user onto the screen or scene to affect a corresponding dynamic behavior of a real or projected objects. The sensor/camera data may be used to determine momentum and inertia factors to allow a variety of momentum behaviors for a play device or projected object based on input from the user's hand, such as a swipe rate of a user's finger relative to the scene or a screen. The gesture recognition interface may also observe eye tracking and other gestures (e.g., with or without additional cameras). Keyboard or button inputs may also be received and recognized by the gesture recognition interface.

The system 180 may further include a gaming manager and a 3D interaction and effects manager. The gaming manager can be used to provide game play in the context of the play devices and objects that are present in the play area. The game play may include image motion, image size, and angle changes of projected objects in the play area or in a three-dimensional space to provide velocity and direction effects for objects in the play area and to add additional projected objects to the play area. The gaming manager may also provide projected elements for selection by the user, such as the palettes shown on the display of a remote control device. The gaming manager may also take input from the input interface to allow different types of inputs to create elements in a managing the game.

The 3D image interaction and effects manager may generate a three-dimensional space including projected and real objects and may track projected object interactions with captured images and video. The 3D image interaction and effects manager may then allow the projected objects in the three-dimensional generated space to be mapped to the corresponding location in the play area.

These modules may advantageously allow information from the captured content of the play area to be applied to the projections with better depth information, thus providing more realistic control of the projections in the play area. Advantageously, the projection coordinator 193 may take input from the object recognition and tracking modules, the gaming manager, and/or the 3D image interaction and effect manager to coordinate projections from the central computing device 183 and the play devices 181. The projection response rules 188 may operate independently, may be provided by the projection coordinator 193 (e.g. for a particular play context), or may be overridden by the gaming manager (e.g. for a particular game context). In some embodiments of the system 180, the central computing device 183 may include a story module 194 to store a story with sequential projections that drives the behaviors of the play devices 181. The play devices 181 may operate automatically after the user launches a story (e.g. to play out the complete story), or the gaming manager may present a story scene based on what objects are detected within the frame of a central camera (or as the play context progresses along the story line).

Each of the foregoing components, modules, and interfaces may be communicatively coupled to each other as needed either directly or by a bus or set of busses.

Additional Notes and Examples:

Example 1 may include an interactive play system, comprising one or more play devices, one or more remote control devices, and a game director communicatively coupled to the one or more play devices and the one or more remote control devices to direct play between the one or more play devices, the game director including a camera to capture images of a play area, a visual analyzer communicatively coupled to the camera to analyze the captured images, a projector to project images on the play area, and a projection coordinator communicatively coupled to the visual analyzer and the projector to coordinate images projected by the projector in accordance with the directed play, wherein the one or more play devices are further to respond to the images projected by the projector.

Example 2 may include the interactive play system of Example 1, further comprising a story module to provide a set of projections to direct play of the one or more play devices.

Example 3 may include the interactive play system of Examples 1 and 2, wherein at least one play device of the one or more play devices includes a mobile play device comprising a device camera on the mobile play device to capture images, a device projector on the mobile play device to project images, and a projection responder communicatively coupled to the device camera and the device projector to respond to one or more of the game director, an image projected by the projector of the game director, or an image projected by the device projector based on a set of projection response rules.

Example 4 may include an interactive play apparatus, comprising a camera to capture a projected image, an image recognizer communicatively coupled to the camera to recognize the captured projection image, and a projection responder communicatively coupled to the image recognizer to respond to the recognized projection image.

Example 5 may include the interactive play apparatus of Example 4, further comprising a communication interface communicatively coupled to the projection responder to communicate with one or more of a game director, a play device, or a remote control device, wherein the projection responder is further to respond to one or more of the game director, the play device, or the remote control based on a set of projection response rules.

Example 6 may include the interactive play apparatus of Example 5, wherein the projection responder is further to authenticate an interaction with one or more of the game director, the play device, or the remote control based on a projected authentication image.

Example 7 may include the interactive play apparatus of Examples 4 to 6, further comprising a projector communicatively coupled to the projection responder to project an image selectively identified by the projection responder.

Example 8 may include the interactive play apparatus of Example 7, further comprising a housing to house one or more of the camera, the image recognizer, or the projection responder, wherein the projector is mechanically coupled to one of the housing, the remote control device, or the game director.

Example 9 may include the interactive play apparatus of Examples 4 to 8, further comprising a mobility subsystem to provide mobility for the interactive play apparatus.

Example 10 may include the interactive play apparatus of Examples 4 to 9, further comprising a projection medium output device to output a projection medium.

Example 11 may include the interactive play apparatus of Example 10, wherein the projection medium includes one or more of smoke, fog, mist, spray, haze, or compressed gas.

Example 12 may include a method of interactive play, comprising providing a play device, capturing a projected image by the play device, recognizing the captured projection image by the play device, and performing an action by the play device in response to the recognized projection image.

Example 13 may include the method of interactive play of Example 12, further comprising communicating with one or more of a game director, a second play device, or a remote control device, providing a set of projection response rules, and performing the action by the play device in response to a communication from one or more of the game director, the second play device, or the remote control based on the set of projection response rules.

Example 14 may include the method of interactive play of Example 13, further comprising authenticating an interaction with one or more of the game director, the second play device, or the remote control based on a projected authentication image.

Example 15 may include the method of interactive play of Examples 12 to 14, further comprising projecting a device-projected image from the play device, capturing the device-projected image by the play device, recognizing the captured device-projected image, and performing another action by the play device in response to the recognized device-projected image.

Example 16 may include the method of interactive play of Examples 12 to 15, further comprising providing mobility for the play device.

Example 17 may include the method of interactive play of Examples 12 to 16, further comprising outputting a projection medium from the play device.

Example 18 may include the method of interactive play of Example 17, wherein the projection medium includes one or more of smoke, fog, mist, spray, haze, or compressed gas.

Example 19 may include at least one computer readable medium comprising a set of instructions, which when executed by a play computing device, cause the play computing device to capture a projected image, recognize the captured projection image, and perform an action in response to the recognized projection image.

Example 20 may include the at least one computer readable medium of Example 19, comprising a further set of instructions, which when executed by the play computing device, cause the play computing device to communicate with one or more of a game director, a second play device, or a remote control device, provide a set of projection response rules, and perform the action in response to a communication from one or more of the game director, the second play device, or the remote control based on the set of projection response rules.

Example 21 may include the at least one computer readable medium of Example 20, comprising a further set of instructions, which when executed by the play computing device, cause the play computing device to authenticate an interaction with one or more of the game director, the second play device, or the remote control based on a projected authentication image.

Example 22 may include the at least one computer readable medium of Examples 19 to 21, comprising a further set of instructions, which when executed by the play computing device, cause the play computing device to project a device-projected image from the play computing device, capture the device-projected image, recognize the captured device-projected image, and perform another action in response to the recognized device-projected image.

Example 23 may include the at least one computer readable medium of Examples 19 to 22, comprising a further set of instructions, which when executed by the play computing device, cause the play computing device to provide mobility for the play computing device.

Example 24 may include the at least one computer readable medium of Examples 19 to 23, comprising a further set of instructions, which when executed by the play computing device, cause the play computing device to output a projection medium from the play computing device.

Example 25 may include the at least one computer readable medium of Example 24, wherein the projection medium includes one or more of smoke, fog, mist, spray, haze, or compressed gas.

Example 26 may include an interactive play apparatus, comprising means for providing a play device, means for capturing a projected image by the play device, means for recognizing the captured projection image by the play device, and means for performing an action by the play device in response to the recognized projection image.

Example 27 may include the interactive play apparatus of Example 26, further comprising means for communicating with one or more of a game director, a second play device, or a remote control device, means for providing a set of projection response rules, and means for performing the action by the play device in response to a communication from one or more of the game director, the second play device, or the remote control based on the set of projection response rules.

Example 28 may include the interactive play apparatus of Example 27, further comprising means for authenticating an interaction with one or more of the game director, the second play device, or the remote control based on a projected authentication image.

Example 29 may include the interactive play apparatus of Examples 26 to 28, further comprising means for projecting a device-projected image from the play device, means for capturing the device-projected image by the play device, means for recognizing the captured device-projected image, and means for performing another action by the play device in response to the recognized device-projected image.

Example 30 may include the interactive play apparatus of Examples 26 to 29, further comprising means for providing mobility for the play device.

Example 31 may include the interactive play apparatus of Examples 26 to 30, further comprising means for outputting a projection medium from the play device.

Example 32 may include the interactive play apparatus of Example 31, wherein the projection medium includes one or more of smoke, fog, mist, spray, haze, or compressed gas.

Embodiments are applicable for use with all types of semiconductor integrated circuit ("IC") chips. Examples of these IC chips include but are not limited to processors, controllers, chipset components, PLAs, memory chips, network chips, SoCs, SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An interactive play system, comprising:
   one or more play devices, wherein a real play device of the one or more play devices includes:
   a camera to capture a projected authentication image and a projected gameplay image each including one or more virtual objects;
   an image recognizer communicatively coupled to the camera to recognize the projected authentication image and the projected gameplay image; and
   a projection responder communicatively coupled to the image recognizer to:
   use the projected authentication image as a key to establish a trusted interaction with the real play device; and
   cause the real play device to automatically act based on an aspect of the projected gameplay image;
   one or more remote control devices; and
   a game director communicatively coupled to the one or more play devices and the one or more remote control devices to direct play between the one or more play devices, the game director including:
   a camera to capture images of a play area;
   a visual analyzer communicatively coupled to the camera to analyze the captured images;
   a projector to project images including one or more of the projected authentication image or the projected gameplay image on the play area; and
   a projection coordinator communicatively coupled to the visual analyzer and the projector to coordinate images projected by the projector in accordance with the directed play.

2. The interactive play system of claim 1, further comprising:
   a story module to provide a set of projections to direct play of the one or more play devices.

3. The interactive play system of claim 1, wherein the real play device includes a mobile play device comprising a device projector on the mobile play device to project images, wherein the projection responder is to cause the mobile play device to act only when the image recognizer of the mobile play device is to recognize the projected authentication image, and wherein the projection responder is to cause the mobile play device to automatically act based on an aspect of an image projected by the projector of the game director and an aspect of an image projected by the device projector based on a set of projection response rules.

* * * * *